United States Patent
Theismann et al.

(10) Patent No.: US 11,795,989 B2
(45) Date of Patent: Oct. 24, 2023

(54) FASTENER ASSEMBLY

(71) Applicant: INFASTECH INTELLECTUAL PROPERTIES PTE LTD, Singapore (SG)

(72) Inventors: Mark Theismann, Decorah, IA (US); Alan Shindelar, Calmar, IA (US); Richard Lukes, Calmar, IA (US)

(73) Assignee: INFASTECH INTELLECTUAL PROPERTIES PTE LTD, Singapore (SG)

(*) Notice: Subject to any disclaimer, the term of this patent is extended or adjusted under 35 U.S.C. 154(b) by 355 days.

(21) Appl. No.: 17/034,929

(22) Filed: Sep. 28, 2020

(65) Prior Publication Data
US 2021/0108671 A1 Apr. 15, 2021

Related U.S. Application Data

(60) Provisional application No. 62/915,243, filed on Oct. 15, 2019.

(51) Int. Cl.
*F16B 37/14* (2006.01)
*F16B 41/00* (2006.01)

(52) U.S. Cl.
CPC ............ *F16B 37/14* (2013.01); *F16B 41/005* (2013.01)

(58) Field of Classification Search
CPC ........ F16B 33/00; F16B 33/004; F16B 37/14; F16B 41/005; F16B 43/00; F16B 43/001
USPC ....... 411/366.1, 368, 369, 372.5–372.6, 373, 411/377
See application file for complete search history.

(56) References Cited

U.S. PATENT DOCUMENTS

| | | | |
|---|---|---|---|
| 2,348,589 A * | 5/1944 | Auten | F16B 37/005 411/339 |
| 3,425,313 A | 2/1969 | Villo | |
| 3,584,667 A * | 6/1971 | Reiland | F16D 1/101 81/460 |
| 3,885,492 A | 5/1975 | Gutshall | |
| 4,154,138 A | 5/1979 | Melone | |
| 4,235,147 A | 11/1980 | Weidner, Jr. | |
| 4,316,690 A | 2/1982 | Voller | |
| 4,452,556 A | 6/1984 | Nelson et al. | |
| 4,482,278 A | 11/1984 | Dorn | |
| 4,490,083 A | 12/1984 | Rebish | |
| 4,647,264 A * | 3/1987 | Pamer | F16B 19/1027 411/338 |
| 5,244,326 A * | 9/1993 | Henriksen | F16B 33/002 411/339 |
| 5,290,131 A | 3/1994 | Henriksen | |
| 5,454,676 A * | 10/1995 | Conte | A63C 17/0006 411/339 |
| 6,012,763 A | 1/2000 | Clemente et al. | |
| 6,302,630 B1 | 10/2001 | Grant | |
| 6,739,813 B1 | 5/2004 | Gundy et al. | |

(Continued)

*Primary Examiner* — Roberta S Delisle
(74) *Attorney, Agent, or Firm* — Kofi A. Schulterbrandt

(57) ABSTRACT

A fastener assembly to be used in the construction of semi-trailers consisting of a first fastener having a head and a shank, a mating second fastener, and a plurality of axially extending knurls formed on the shank. The knurls engage in a hole for receiving the first fastener to prevent rotation and removal of the first fastener. The first fastener may also be provided with an encapsulating cover with two sealing points on its underside to seal the fastener to a surface through which the fastener is inserted.

19 Claims, 3 Drawing Sheets

(56) References Cited

U.S. PATENT DOCUMENTS

| | | |
|---|---|---|
| 8,434,982 B2 | 5/2013 | Henriksen, Jr. |
| 8,936,423 B2 | 1/2015 | Davis et al. |
| 9,435,362 B2 | 9/2016 | Hurst |
| D793,850 S * | 8/2017 | Zhang .......................... D8/387 |
| 10,125,805 B2 * | 11/2018 | Park .................... F16B 25/0084 |
| 11,466,720 B2 * | 10/2022 | Dilling .................. F16B 23/003 |
| 2008/0166203 A1 | 7/2008 | Reynolds et al. |
| 2012/0114447 A1 * | 5/2012 | Henriksen, Jr. ......... F16B 37/14 |
| | | 411/366.1 |
| 2012/0263557 A1 * | 10/2012 | Spencer ................ F16B 5/0241 |
| | | 411/366.1 |

* cited by examiner

FASTENER ASSEMBLY

CROSS-REFERENCE TO RELATED APPLICATION

This application claims priority to U.S. Provisional Patent Application No. 62/915,243, filed Oct. 15, 2019, the disclosures of which are incorporated herein by reference.

BACKGROUND OF THE INVENTION

The present invention relates to a fastener assembly, and in particular to a fastener assembly having a knurled shank and an encapsulating plastic seal protecting the exterior portion of the fastener assembly. U.S. Pat. Nos. 5,244,326 and 5,290,131 disclose generally related material and are both hereby incorporated herein in their entirety by reference.

It is well known in the art to encapsulate fasteners with some type of a plastic covering. Such covered heads are disclosed in U.S. Pat. Nos. 73,088; 563,969; 1,941,175; 1,867,354; 3,470,787; 3,693,495 and 4,293,243. Other types of covered heads are disclosed in U.S. Pat. Nos. 3,134,290; 4,316,690; 8,434,982; 4,373,842; and 4,482,278.

In addition to the need for a covered head to prevent corrosion of the fastener, there is a shortcoming in presently used fasteners in some situations and environments in that a first part of a fastener, such as a T-nut on a screw, is applied from one side of a wall or other structure and the second part of the fastener, such as a screw or a locking nut, respectively, is applied from the other side of the wall or structure not accessible to the person applying the first portion of the fastener. Therefore at least two persons are required for the assembly operation, or else one person must insert all of the first portions of the fasteners from one side of the wall and then must hope that those fasteners will not fall out, be pushed out, or turn when the second parts of the fasteners are being applied from the other side of the wall.

Oftentimes, for example in the applying threaded fasteners through the wall of a semitrailer truck body, the first fastener parts become dislodged or turn while the nuts are being applied thus requiring two persons to complete the operation of applying the fasteners to the truck body. In addition, there is a consideration to minimize the axial length of the assembly that extends out past the walls to be secured to ensure that the assembly has as low a profile as possible. At the same time, if the assembly needs to be removed, there needs to be sufficient axial extension past the walls so a tool can axially overlap the axial extension and rotatably grip one end of the assembly. In other words, too much axial extension would create an undesirable high profile and too little axial extension would offer too little axial projection to grip and end of the assembly and generate sufficient torque to remove the assembly. Finally, it may become necessary to remove the plastic cover from one or the other side of the assembly. As the plastic ages, it can have a tenancy for portions of the plastic to remain on the head after removal. That plastic can remain on portions of the head where it could prevent proper engagement with the shaped removal tool. The structure of the head on which the plastic is placed can aid in a more complete removal of the plastic. For example, the structure disclosed in the present invention allows the plastic on a head of the assembly to be popped off (e.g., with a plyer). The plastic is popped off such that the shaped projection (e.g., external Torx) is no longer covered by the plastic.

It would be an improvement in the art if such a fastener assembly included portions that extended sufficiently from the truck walls to facilitate a tool connection that could sustain sufficient torque to remove the fastener, but not so much extension as to create a higher than desirable profile. It would also be an improvement to have a head structure which facilitated clean removal of the plastic covering from the shaped driver portion of the head.

SUMMARY OF THE INVENTION

The present invention provides an improved fastener assembly which permits assembly of a first fastener part through a wall to a second fastener part without requiring a person on each side of the wall. The first fastener part may comprise a T-nut which has a shank with external knurls projecting therefrom and a hollow body with an internal thread therein. A second fastener member in the form of a screw is introduced from an opposite side of the wall into the hollow interior of the barbed shank to complete the fastener assembly. The knurled shank prevents the first portion of the fastener assembly from coming loose or from rotating while the threaded fastener is being inserted and tightened to the first fastener part.

The knurls on the shank of the first fastener part are arranged to allow for fairly easy entry of the first fastener part into the wall, yet prevent readily removal of the first fastener part from the wall. The knurls are spaced around the circumference of the shank to prevent rotation of the first fastener part in the wall.

In a preferred embodiment of the invention the head of the first fastener part may have an encapsulating plastic seal provided thereon to protect the exterior portion of the fastener assembly (i.e., the part outside the truck). Such a seal preferably would have two sealing points on the underside of the head being an outer lip and an inner lip. The outer lip should be formed to extend radially outwardly when the fastener assembly is secured in place and the inner lip should be formed to extend radially inwardly when the fastener assembly is secured in place.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DETAILED DESCRIPTION OF THE PREFERRED EMBODIMENTS

Figure 1A:
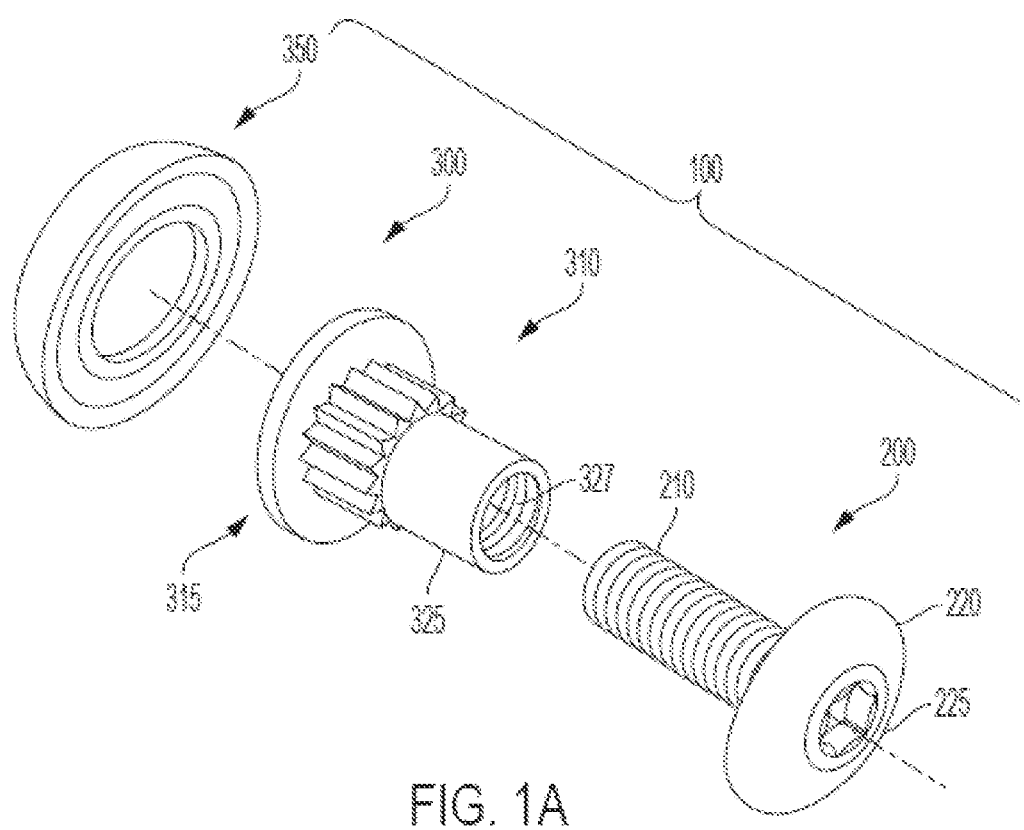
FIG. 1A is an exploded bottom perspective view of a fastener assembly of the present invention.
Figure 1B:
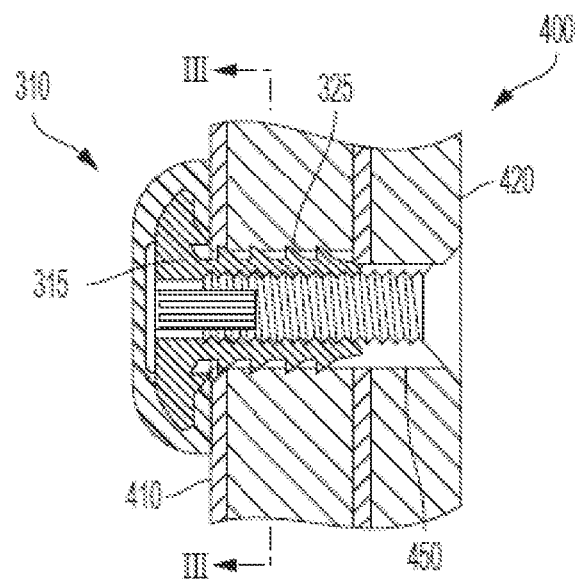
FIG. 1B is a cross-sectional view of an assembled prior art fastener assembly.

FIG. 1A illustrates a fastener assembly 100 of the present invention. Fastener assembly 100 includes a screw 200 and a T-nut assembly 300. T-nut assembly 300 may further include an encapsulating plastic seal 350 covering head 315. Screw 200 may include a head 220 with a recess 225. FIG. 1B illustrates a semi-trailer wall assembly 400. Semi-trailer wall 410 is made of a single piece of glass fiber reinforced plywood and has a protective perforated metal sheet 420 as an interior backing. The top and bottom portions of the glass fiber reinforced plywood 410 are received in an aluminum channel (not shown).

T-nut assembly 300 consists of a first fastener part, generally designated 310, which may be a T-nut having a T-nut head 310 and a hollow T-nut post 325 which is interiorly threaded. FIGS. 2A, 2B, 2C, and 2D, show a first embodiment of a T-nut 500 of the fastener assembly 100. T-nut 500 includes a first end having a head 520 which would correspond to head 315 in FIG. 1A and a second end having a shank 325, 560, 760. Shank 325 includes a hollow or female threaded bore 565, 765 corresponding to 327 of FIG. 1A. Threaded bore 565 may extend axially past a lower flange surface 527. When bore 565 extends past flange 525, an external drive projection may be more appropriate as an internal drive could interfere with bore 565. The external nature of shaped drive projection 540 accommodates a larger bore 565 and thereby allows T-nut 300 to accommodate a larger range of lengths of screw shaft 210. Such accommodation allows fewer T-nut/screw combinations to satisfy a larger variety of truck wall thicknesses. Head 520 includes a disk-shaped flange 525. Disk shaped flange 525 includes a flat inner annular surface 527 in a shank direction of T-nut 500. Disk shaped flange 525 also includes an opposite outer flat surface 529 in a driver projection direction. Inner surface 527 may engage an outer surface of the wall or work-piece when T-nut 500 is fully and directly assembled to the truck wall.

Figure 2A:
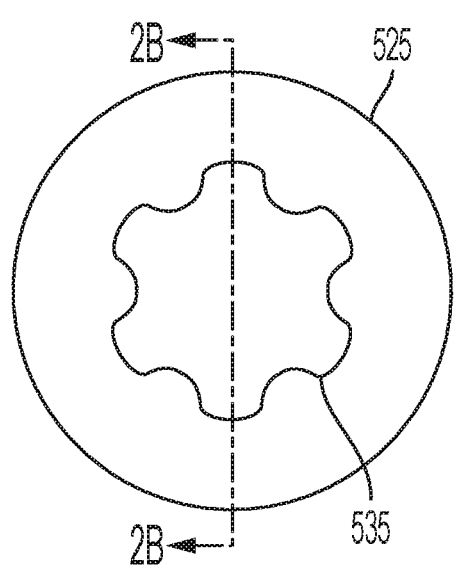
FIG. 2A is a top view of a first embodiment of the assembly of the present invention.
Figure 2B:
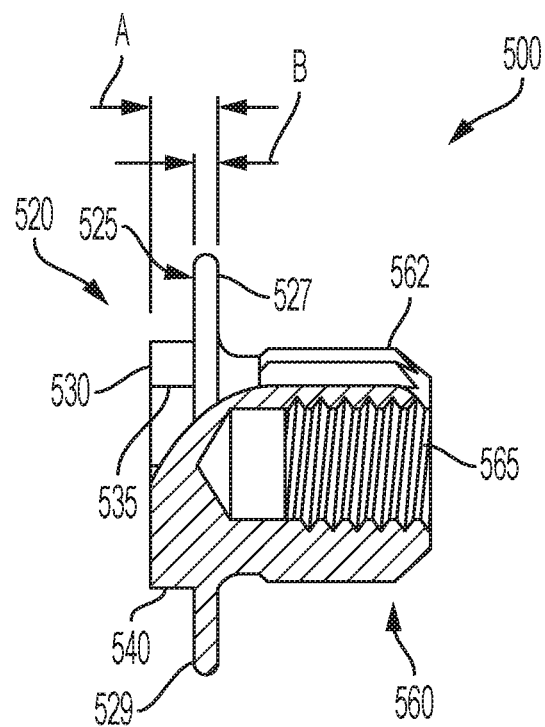
FIG. 2B is a side cross-sectional cut-away view of a t-nut of the assembly FIG. 2A.
Figure 2C:
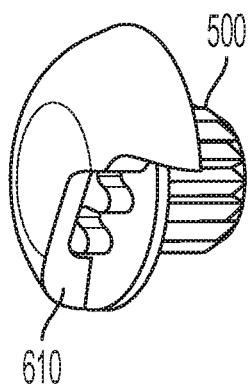
FIG. 2C is a top perspective view of T-nut of FIG. 2A with plastic over-mold cutaway to show the T-nut head.

Extending axially outward from the flange outer surface 529 is a drive projection 540. Drive projection 540 has a maximum height ending at top surface 530 to ensure that fastener assembly 100 has a low-profile nature when assembled. FIGS. 2B and 2B shows an axial dimensions A and B related to the. Dimension A is from about 0.10 to about 0.17 inches. Dimension B is from about 0.047 to about 0.057 inches. The thickness in the axial direction of the shaped drive projection above flange surface 529 (A-B) is about 2 or 3 times the axial thickness of the flange.

Figure 2D:
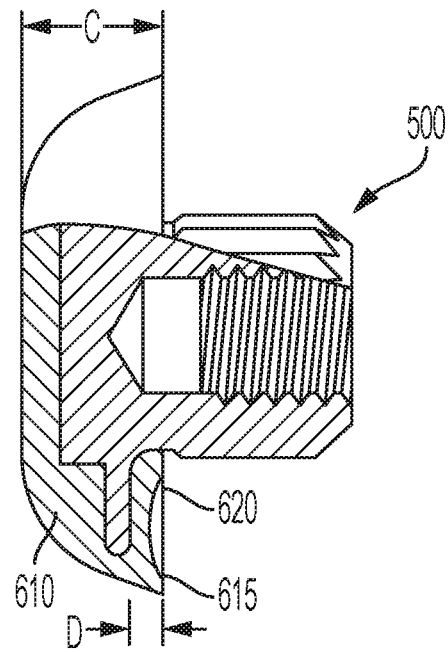
FIG. 2D is a cross sectional cut-away view of the T-nut of the assembly FIG. 2A.

Drive projection 540 is received in and by a socket driver tool when a torque is to be applied to the fastener (e.g., for removal). When applying torque, an axially extending shaped wall surface 535 of drive projection 540 is urged/forced radially about a central longitudinal axis of the T-nut to generate sufficient torque for tightening or removal. As shown in FIG. 2D, the T-nut head 520 can be completely covered by a dome-shaped encapsulating plastic seal 610. When plastic seal 610 is employed, an under side of the plastic seal may engage outer surface of the work-piece (e.g., outer truck wall). In a low-profile configuration, an axial thickness C between a lower plastic seal engagement surface and an axially uppermost extent of plastic seal 610 is about 0.24 inches to about 0.33 inches. Furthermore, the thickness of a body portion D of the plastic seal under flange 525 is about 0.03 to about 0.095 inches.

As shown, plastic seal 610 is wrapped around disk shaped flange 525 which flange extends radially outward from drive projection 540. The geometry of the flange 525 and drive projection 540, enables a plyer type tool to engage (e.g., inward squeeze pressure) a periphery of the plastic cover at a flange 525 periphery. An inward force on the plastic seal 610 may cause plastic seal 610 to buckle and generate an upward force on the plastic at the drive projection. The upward force on the drive projection promotes a complete separation of the plastic cover 610 from drive projection 540 so as to minimize any plastic residue remaining on drive portion 540. A drive portion 540 that has no plastic residue thereon will in turn promote adequate placement engagement between the removal tool and the shaped drive projection 540. The external aspect of drive projection 540 may also promote separation from the plastic cover more so than an internal drive recess might.

Hollow threaded shank 560 includes an outer cylindrical surface which has a plurality of axial extending knurls 562 formed thereon around the periphery. Knurls 562 may have a ramped surface in a radial direction as shown in FIG. 1A which permits T-nut assembly 300, 500 to be relatively easily inserted into a hole 450 formed in the trailer wall 410 while preventing or retarding removal of t-nut assembly 300. The radial spacing of the knurls prevents T-nut assembly 300 from rotating within the insertion hole 450.

Figure 3A:
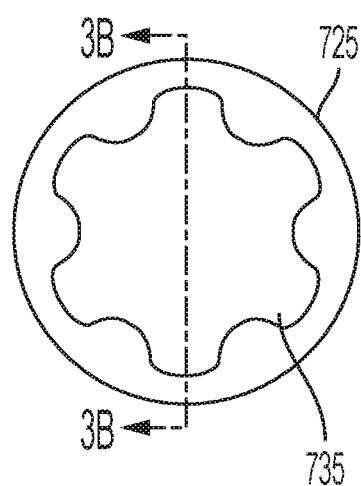
FIG. 3A is a top view of a second embodiment of the assembly of the present invention.
Figure 3B:
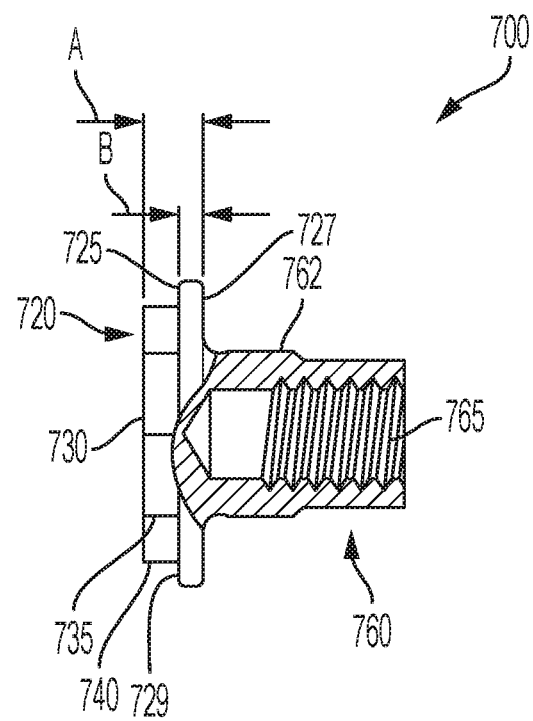
FIG. 3B is a cross-sectional cut-away view of a T-nut of the assembly FIG. 3A.
Figure 3C:
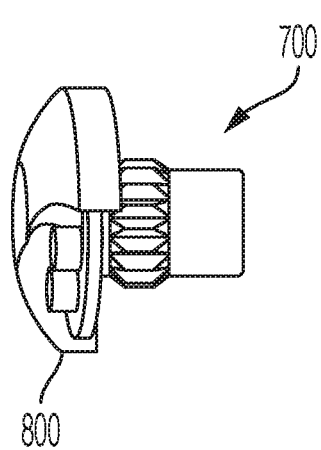
FIG. 3C is a top perspective view of t-nut of FIG. 3A with plastic over-mold cutaway to show the t-nut head.
Figure 3D:
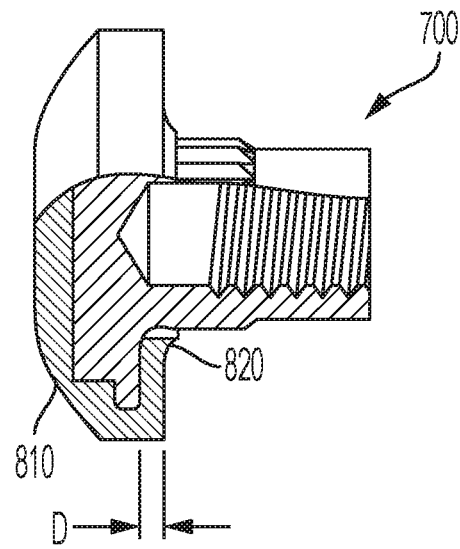
FIG. 3D is a side cross sectional cut-away view of the T-nut of the assembly FIG. 3A.

The underside of the seal 610 may have two sealing points, an outer lip 615 and an inner lip 620. When fastener assembly 100 is tightened into position, outer lip 615 is pushed radially downwardly and outwardly, When the fastener assembly 100 is tightened into position, the inner lip 620 is pushed downwardly and inwardly (toward the T-nut shank 560). The mating fastener for T-nut 500 may be a conventional screw generally designated 200, having a threaded shank 210 and a head 220. Head 220 may include an internal or external shaped portion for receiving or being received by a driver. FIGS. 3A, 3B, 3C and 3D are respectively similar to FIGS. 2A, 2B, 2C, 2D and have corresponding reference numbers plus 200. Therefore, 700 is a T-nut, 720 is a T-nut head, 725 is a flange, 727 is an inner surface, 729 is the flange outer surface, 730 is a top surface, 735 is an axially extending shaped wall surface, 740 is a drive projection, and 762 are axial extending knurls. In FIG. 3C, 700 is a T-nut and 800 is a plastic seal. In FIG. 3D, 700 is a T-nut. 810 is a plastic seal and 820 is an inner lip.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

What is claimed is:

1. A nut of a fastener assembly, the fastener assembly for fastening two workpieces together and including the nut and a screw and is assembled along a central longitudinal axis, the screw including an externally threaded shaft and a radially enlarged screw head, the nut comprising:

a generally cylindrical shank extending axially toward a first longitudinal end of the nut and a nut head that is radially enlarged relative to the shank and disposed at a second longitudinal end of the nut, the shank including a threaded bore that is accessible at the first end to the externally threaded shaft of the screw, an exterior of the shank including a plurality of knurls extending radially and longitudinally therefrom, the nut head having a flange, the flange including a bottom side adjacent to the shank and an opposite top side, the nut head also including a shaped drive projection extending axially away from the flange and toward the second longitudinal end, the shaped projection including a longitudinally extending engagement surface for engaging a torque applying tool, the engagement surface facing radially outward, a plastic cover, the plastic cover surrounding the head of the nut and at least a portion of the shank, wherein, in use, the plastic cover forming a seal with at least one of the workpieces, and wherein at least a portion of the plastic cover is removeable from the head to access the shaped drive projection.

2. The nut of claim 1, wherein the plastic cover encapsulates the shaped drive projections.

3. The nut of claim 1, wherein a distance between the flange bottom side and the end of the shaped drive projection is about 0.1 inches to about 0.17 inches.

4. The nut of claim 1, wherein a diameter of the flange being at least 3% larger than the major diameter of the shaped drive projection.

5. The nut of claim 1, wherein an upper surface of the flange limits an axial position of a tool around the shaped drive projection.

6. The nut of claim 1, wherein the threaded bore of the nut includes an anti-loosening thread form.

7. The nut of claim 1, wherein the axial thickness of the shaped drive projection is less than two times the axial thickness of the flange.

8. The nut of claim 1, wherein the axial thickness of the shaped drive projection is less than 3 times the axial thickness of the flange.

9. The nut of claim 1, wherein the blind end of the threaded bore extends axially toward the second longitudinal end past the bottom side of flange.

10. The assembly of claim 1, wherein the shaped drive projection is a six-lobe drive projection.

11. In combination, a nut and a screw forming a fastener assembly for fastening two workpieces together, the screw including an externally threaded shaft and a radially enlarged head, a generally cylindrical shank extending axially toward a first longitudinal end of the nut and a nut head that is radially enlarged relative to the shank and disposed at a second longitudinal end of the nut, the shank including a threaded bore that is accessible at the first end to the externally threaded shaft of the screw, an exterior of the shank including a plurality of knurls extending radially and longitudinally therefrom, the nut head having a flange, the flange including a bottom side adjacent to the shank and an opposite top side, the nut head also including a shaped drive projection extending axially away from the flange and toward the second longitudinal end, the shaped projection including a longitudinally extending engagement surface for engaging a torque applying tool, the engagement surface facing radially outward, a plastic cover, the cover surrounding the head of the nut and at least a portion of the shank, wherein, in use, the plastic cover forming a seal with at least one of the workpieces, and wherein at least a portion of the plastic cover is removable from the head to access the shaped drive projection.

12. The assembly of claim 11, wherein the cover encapsulates shaped drive projection.

13. The assembly of claim 11, wherein a distance between the flange bottom side and the end of the shaped drive projection is about 0.1 inches to about 0.17 inches.

14. The assembly of claim 11, wherein a diameter of the flange being at least 3% larger than the major diameter of the shaped drive projection.

15. The assembly of claim 11, wherein an upper surface of the flange limits an axial position of a tool around the shaped drive projection.

16. The assembly of claim 11, wherein the threaded bore of the nut includes an anti-loosening thread form.

17. The assembly of claim 11, wherein the axial thickness of the shaped drive projection is less than two times the axial thickness of the flange.

18. The assembly of claim 11, wherein the axial thickness of the shaped drive projection is less than 3 times the axial thickness of the flange.

19. The assembly of claim 11, wherein the blind end of the threaded bore extends axially toward the second longitudinal end past the bottom side of the flange.

\* \* \* \* \*